United States Patent [19]
Augustin et al.

[11] 4,144,442
[45] Mar. 13, 1979

[54] PROCESS FOR PRODUCING A COMPONENT PART OF A RAILWAY SWITCH OR A RAILWAY CROSSING AND COMPONENT PART OF RAILWAY SWITCHES OR RAILWAY CROSSINGS PRODUCED BY SUCH PROCESS

[75] Inventors: Hubert Augustin, Loeben; Eduard Friesenbichler, Zeltweg; Alfred Moser, Leoben, all of Austria

[73] Assignee: Vereinigte Osterreichische Eisen- und Stahlwerke-Alpine Montan Aktiengesellschaft, Vienna, Austria

[21] Appl. No.: 796,246

[22] Filed: May 23, 1977

[30] Foreign Application Priority Data

May 18, 1976 [AT] Austria ................................. 3605/76

[51] Int. Cl.² ............................................. B23K 11/04
[52] U.S. Cl. .................................. 219/106; 219/76.11; 219/99; 219/118
[58] Field of Search ..................... 219/76.11.76.17, 99, 219/100, 104, 106, 107, 118; 104/15

[56] References Cited

U.S. PATENT DOCUMENTS

| | | | |
|---|---|---|---|
| 1,246,909 | 11/1917 | Goldschmidt | 219/106 X |
| 1,712,524 | 5/1929 | Schultz | 219/104 X |
| 2,183,047 | 12/1939 | Schenk | 219/100 |
| 3,202,791 | 8/1965 | Gillock | 219/104 X |
| 3,821,840 | 7/1974 | Kershaw | 219/76.14 X |
| 3,925,636 | 12/1975 | Coleman | 219/104 |

FOREIGN PATENT DOCUMENTS 563555 9/1958 Canada ..................................... 104/15

Primary Examiner—Richard R. Kucia
Attorney, Agent, or Firm—Cushman, Darby & Cushman

[57] ABSTRACT

Process for producing a component part of a railway switch or of a railway crossing in which frogs consisting of austenitic manganese steel casting are, with interposition of an intermediate piece, connected by a welding operation with rails consisting of carbon steel, characterized in that an intermediate piece is welded to the portions of the frog or of the component part of the railway crossing which are to be connected with the rails, and in that this intermediate piece consists of austenitic steel, whereupon the frog or the component part of the railway crossing is, together with the intermediate piece, heated to a temperature, preferably to about 1050° C., at which any embrittlement of the workpiece is removed, and whereupon the frog or the component part of the crossing having the intermediate piece welded thereto is rapidly cooled, for instance by quenching with water, and whereupon the rail is welded to the intermediate piece and subsequently the welding area is allowed to slowly cool, the intermediate piece having a smaller height than has the rail and the frog or the component part of the railway crossing, and further characterized in that prior to heating the frog or component part of the railway crossing and the intermediate piece, a cladding layer forming the running surface and consisting of wear-resistant manganese steel is applied.

11 Claims, 3 Drawing Figures

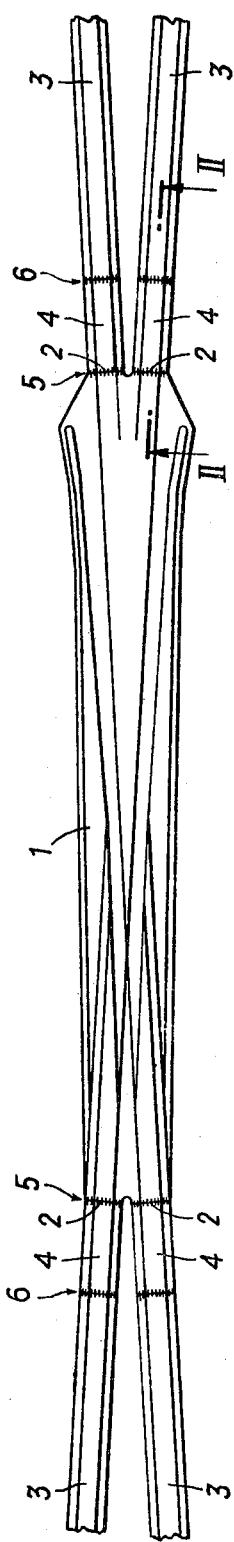
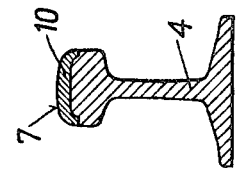
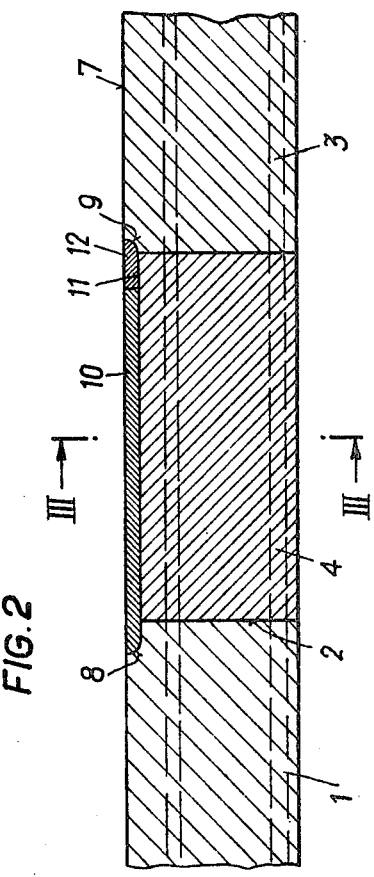

PROCESS FOR PRODUCING A COMPONENT PART OF A RAILWAY SWITCH OR A RAILWAY CROSSING AND COMPONENT PART OF RAILWAY SWITCHES OR RAILWAY CROSSINGS PRODUCED BY SUCH PROCESS

The present invention refers to a process for producing a component part of a railway switch or of a railway crossing in which frogs consisting of austenitic manganese steel casting are, with interposition of an intermediate piece, connected by a welding operation with rails of carbon steel. The present invention further refers to a component part of railway switches or railway crossings produced by such a process. During the welding operation, the component parts to be mutually connected are heated to a relatively high temperature. Austenitic manganese steel castings have the property of becoming very brittle on account of carbide segregation when heating the casting to temperatures above 300° C. On slow cooling of the casting, the brittle structure is maintained and, for removing the embrittlement, it is necessary to heat the casting to a temperature of about 1050° C. and then to effect a rapid cooling, for example by quenching in water. On the other hand, the carbon steel forming the rails has the property of becoming brittle on rapid cooling and to avoid such embrittlement, cooling has to be effected slowly. In view of the high strength properties of austenitic manganese steel castings, railway companies request that frogs and component parts of railway crossings be manufactured from austenitic manganese steel castings. These antithetic requirements result in considerable difficulties when connecting by welding frogs or component parts of railway crossings consisting of austenitic manganese steel castings with rails consisting of usual rail steel. Therefore, frogs and component parts of railway crossings have, up till now, been connected to rails by means of splice strips. In view of the necessity to electrically isolate rails, the frogs have to be given a certain constructional length which, when connecting the frog with rails by means of splice strips, requires the production of a relatively large casting which is quite disadvantageous in view of the foundry practice. It has also been pronounced to obviate the mentioned difficulty by bluntly welding frogs consisting of austenitic manganese steel casting to the rails by means of electron beam welding under vacuum or substantially reduced gas pressure. This allows localization of any heating to a restricted area, however, the mentioned drawbacks cannot be avoided. Any embrittlement of the manganese steel casting will only be restricted to narrow zone, but such embrittlement remains, with all its drawbacks, unchanged within this zone. Therefore, such a process has not been successful.

The present invention now aims at avoiding the mentioned drawbacks when connecting frogs or component parts of railway crossings consisting of manganese steel casting with rails consisting of carbon steel, and the invention essentially consists in that an intermediate piece known per se is being welded to that portion of the frog or of the component part of the railway crossing which are to be connected with the rails, and in that the intermediate piece consists of austentic steel, whereupon the frog or the component part of the railway crossing is, together with the intermediate piece, heated to a temperature, preferably to about 1050° C., at which any embrittlement of the workpiece is removed, and whereupon the frog or the component part of the crossing having the intermediate piece welded thereto is rapidly cooled, for instance by quenching with water, and whereupon the rail is welded to the intermediate piece and subsequently the welding area is allowed to slowly cool, noting that the intermediate piece has a smaller height than has the rail and the frog or the component part of the railway crossing, and in that prior to heating the block consisting of frog or component part of the railway crossing on the one hand and the intermediate piece on the other hand, a cladding layer forming the running surface and consisting of wear-resistant manganese steel is applied. By selecting, according to the invention, intermediate pieces consisting of austenitic steel, the above-mentioned drawbacks are avoided which result when welding frogs or component parts of railway crossings consisting of austenitic manganese steel casting with intermediate pieces. As has been established by tests the weld seam has only a purely austenitic structure even within an eventual mixing zone. The intermediate pieces consisting of austenitic steel become not embrittled on rapid cooling, so that the block consisting of the frog or the component part of the railway crossing, respectively, and of the intermediate piece, can be heated without further to a temperature of approximately 1050° C. at which any embrittlement is removed whereupon said block can be rapidly cooling without any danger of embrittlement. Such heating and cooling does not represent an additional expenditure, because also frogs or component parts of railway crossings consisting of austenitic manganese steel casting must be heated and rapidly cooled for removing any embrittlement resulting on slowly cooling within the casting mold. The only difference resides in that with the process according to the invention heating and rapid cooling is postponed and is effected after having connected by welding the intermediate pieces. When using intermediate pieces consisting of austenitic steel, any slow cooling does not result in a disadvantageous embrittlement so that it becomes possible to allow, after having welded the rail to the intermediate piece, to slowly cool the welding area, noting that the strength properties of the intermediate piece and of the rail are not impaired. The process according to the invention provides the additional advantage that only the very core of the frog or of the component part of the railway crossing need be manufactured of manganese steel casting, because the intermediate pieces are firmly welded to the frog or to the component part of the railway crossing. Thus, the casting mold can be kept small and can be favorably shaped according to foundry practice. In view of the intermediate piece having a smaller height than the rail and the frog of the component part of the railway crossing, respectively, and in view of applying a cladding layer forming the running surface and consisting of a wear resistant material prior to heating the block consisting of frog or component part of the railway crossing on the one hand, and the intermediate piece on the other hand, it is considered that the austenitic material of the intermediate piece only insufficiently meets the strength requirements for the running surface of the rail head and that such an intermediate piece of austenitic material would in operation soon become deformed by the pressure and be provided with dent depressions. By applying a cladding layer the running surface of the intermediate piece is provided with favorable strength properties. The cladding layer conveniently consists of material, based on composition and properties, similar to the material of the frog and the component part of the railway crossing, respectively. Preferably, the cladding layer is, according to the invention, applied in a thickness of 7 to 10 mm. According to the invention, the intermediate pieces used preferably have a length of at least 150 mm. With intermediate pieces of such a length the danger can be avoided that the heat produced at the welding area between the intermediate piece and the rail adversely affects the frog or the component part of the railway crossing consisting of austenitic manganese steel casting.

According to the invention the intermediate piece used is preferably an intermediate piece consisting of a material having, according to the Schaffler-diagram, an Ni-equivalent between 15 and 30 and a Cr-equivalent between 8 and 25. A particularly suitable intermediate piece is an intermediate piece consisting of an austenitic Cr-Ni-steel, preferably of the 18/8 alloy type.

When connecting the frog or the component part of the railway crossing, respectively, with the intermediate piece by means of flash welding, the height of the frog or of the component part of the railway crossing, respectively, at the connecting area with the intermediate piece is, according to the invention, conveniently selected of equal height with the intermediate piece, noting that in this case the cladding layer is also applied at the area of the removed running surface of the frog or component part of the railway crossing, respectively. This provides the advantage that the cross-section of the frog or of the component part of the railway crossing, respectively, is, at the welding area, the same as the cross-section of the intermediate piece.

The cladding layer is applied by build-up welding which can be effected without any difficulties on the base material consisting of Cr-Ni-steel. When selecting for the cladding layer a material corresponding to the material of the frog or of the component part of the railway crossing, respectively, it is convenient to not apply this cladding layer up to the connecting area of the rail so that the cladding layer cannot be impaired to embrittlement at the welding seam of the rail. In this case, the process according to the invention is conveniently performed such that the running surface of the rail to be connected to the intermediate piece is removed at the connecting area, that the cladding layer of the intermediate piece is only applied to an area distant from the end of the intermediate piece, and that, after having connected the rail by welding, the remaining interstice is provided with a cladding layer consisting of an austenitic steel, preferably a Cr-Ni-Mn-steel, having a wear-resistance between the wear-resistance of the cladding layer of the intermediate piece and the wear-resistance of the rail. This austenitic material used for the cladding layer at the area of said interstice can be allowed to cool slowly, so that the strength of the rail and of the welding area is not impaired. In view of the wear-resistance of the cladding layer applied at said interstice lies between the wear-resistance at the area of the intermediate piece and the wear-resistance of the rail, there results a favorable transition from the wear-resistance of the frog and the component part of the railway crossing, respectively, and the wear-resistance of the rail. The cladding layer at the area of said interstice can, for instance, be produced of a material of the type 18-86, material No. 4370 SEL.

The invention is further illustrated with reference to the drawing showing an embodiment according to the invention.

FIG. 1 shows a top plan view of a simple, straight frog with rails connected thereto.

FIG. 2 shows the area of an intermediate piece in a section along line II—II of FIG. 1.

FIG. 3 shows a section through the intermediate piece along the line III—III of FIG. 2.

The frog 1 consists of austenitic manganese steel casting. Rails 3 consisting of carbon steel are connected to the connecting areas 2 of the frog 1 with interposition of intermediate pieces 4. The weld seams between the frog 1 and the intermediate pieces 4 are designated 5, whereas the weld seams between the intermediate pieces 4 and the rails are designated 6.

The running surface is given the reference numeral 7. The running surface is, for a depth of 7 to 10 mm, removed at the area of the intermediate piece 4, at the area 8 of the frog 1 and at the area 9 of the connected rail 3. At the area 8 of the frog 1 and at the adjacent greater partial area of the intermediate piece 4, a cladding layer 10 consisting of wear-resistant manganese steel is applied by build-up welding, said manganese steel having essentially the same composition and the same properties as the manganese steel casting forming the frog 1. This cladding layer does not extend up to the connecting area of the rail 3. The remaining interstice 11 is closed, after having connected the rail 3 to the intermediate piece 4 by welding, by means of a cladding layer 12 applied by build-up welding and consisting of an austenitic Cr-Ni-Mn-steel, preferably of the type 18-8-6, material No. 4370 SEL. The rail 3 itself consists of a usual carbon steel, for instance wear-resistant steels according to UIC 860, or special steels (Cr-steels) of higher strengths.

What we claim is:

1. Process for producing a component part of a railway switch or of a railway crossing in which frogs consisting of austenitic manganese steel casting are, with interposition of an intermediate piece, connected by a welding operation with rails consisting of carbon steel, characterized in that the intermediate piece is welded to the portions of the frog or of the component part of the railway crossing which are to be connected with the rails, and in that this intermediate piece consists of austenitic steel, whereupon the frog or the component part of the railway crossing is, together with the intermediate piece, heated to a temperature at which any embrittlement of the workpiece is removed, and whereupon the frog or the component part of the crossing having the intermediate piece welded thereto is rapidly cooled, and whereupon the rail is welded to the intermediate piece and subsequently the welding area is allowed to slowly cool, the intermediate piece having a smaller height than the rail and the frog or the component part of the railway crossing, and further characterized in that prior to heating the frog or component part of the railway crossing and the intermediate piece, a cladding layer forming the running surface and consisting of wear-resistant manganese steel is applied.

2. Process as claimed in claim 1, characterized in that the intermediate pieces used have a length of at least 150 mm.

3. Process as claimed in claim 1, characterized in that the intermediate pieces used consist of a material having, according to the Schaffler-diagram, an Ni-equivalent between 15 and 30 and a Cr-equivalent between 8 and 25.

4. Process as claimed in claim 1, characterized in that the intermediate piece used consists of an austenitic Cr-Ni-steel, preferably of the 18/8 alloy type.

5. Process as claimed in claim 1, characterized in that the cladding layer consists of a material which is, based on composition and properties, equal to the material of the frog or the component part of the railway crossing, respectively.

6. Process as claimed in claim 1, characterized in that the intermediate piece is provided with a cladding layer having a thickness of 7 to 10 mm.

7. Process as claimed in claim 1, characterised in that when connecting the frog or the component part of the railway crossing, respectively, with the intermediate piece by means of flash welding, the height of the frog or of the component part of the railway crossing, respectively, at the connecting area with the intermediate piece is selected of equal height with the intermediate piece, and characterized in that in this case the cladding layer is also applied at the area of the removed running surface of the frog or component part of the railway crossing, respectively.

8. Process as claimed in claim 1, characterized in that the running surface of the rail to be connected to the intermediate piece is removed at the connecting area, that the cladding layer of the intermediate piece is only applied to an area distant from the end of the intermediate piece, and that, after having connected the rail by welding, the remaining interstice is provided with a cladding layer consisting of an austenitic steel having a wear-resistance between the wear-resistance of the cladding layer of the intermediate piece and the wear-resistance of the rail.

9. Component part of a railway switch or of a railway crossing to which a standard rail can be connected by welding, said component part being produced according to the process as claimed in claim 1 and comprising a frog of austenitic manganese steel casting and an intermediate piece welded to said frog and consisting of austenitic or austenitic-ferritic steel, characterized in that the upper surface of the intermediate piece is located below the running surface and in that the interstice between the upper surface of the intermediate piece and the running surface is filled with a cladding material of wear-resistant manganese steel.

10. Component part of a railway switch or a railway crossing produced according to the process as claimed in claim 1 and consisting of a frog of austenitic manganese steel casting and of an intermediate piece welded to this frog and consisting of austenitic or austenitic-ferritic steel, a standard rail being welded to said component part, characterized in that the upper surface of the intermediate piece is located below the running surface and the upper surface of the standard rail is removed at the area immediately adjacent to the intermediate piece, in that the interstice between the upper side of the intermediate piece and the running surface is filled with a cladding material of wear-resistant manganese steel up to an area located in front of the connecting area of the standard rail and in that the remaining portion of the interstice between the upper side of the intermediate piece and of the running surface as well as the interstice between the running surface and the removed portion at the upper side of the standard rail adjacent the intermediate piece is filled with a cladding material of austenitic steel.

11. Component part of a railway switch or of a railway crossing as claimed in claim 9, characterized in that that upper portion of the frog or of the component part of the crossing which is immediately adjacent the intermediate piece is located below the running surface and in that also the interstice between this upper portion of the frog or component part of the crossing and the running surface is filled with a cladding material consisting of wear-resistant manganese steel.

* * * * *